July 28, 1970     D. W. BELLROSE     3,522,394

COMBINED AUTOMOBILE IGNITION AND LIGHT SWITCH

Filed Jan. 24, 1969     2 Sheets-Sheet 1

INVENTOR.
DONALD W. BELLROSE
BY
W. J. Gribble
ATTORNEY

July 28, 1970        D. W. BELLROSE        3,522,394
COMBINED AUTOMOBILE IGNITION AND LIGHT SWITCH
Filed Jan. 24, 1969        2 Sheets-Sheet 2
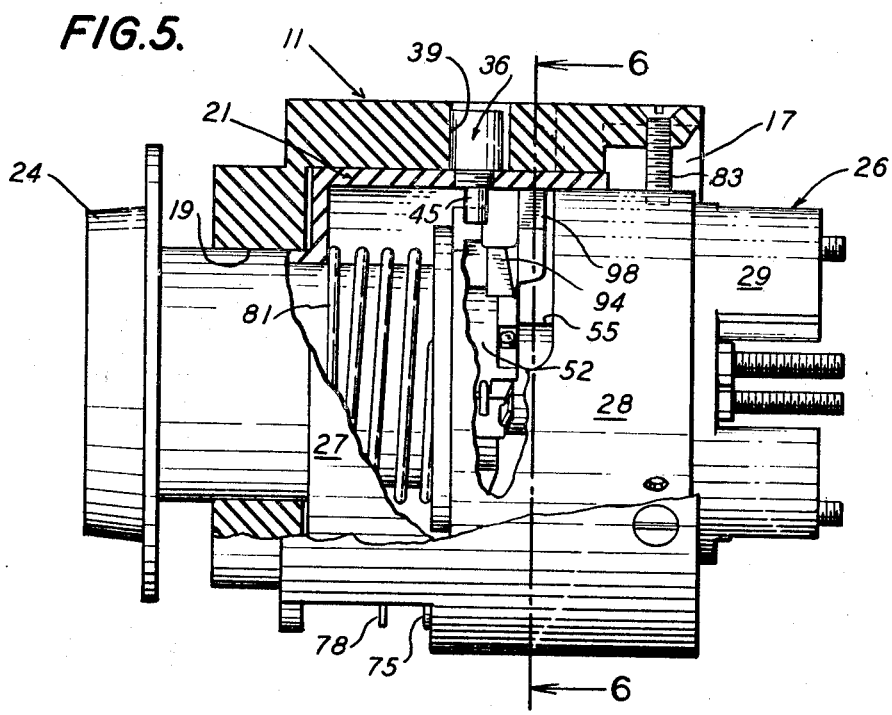
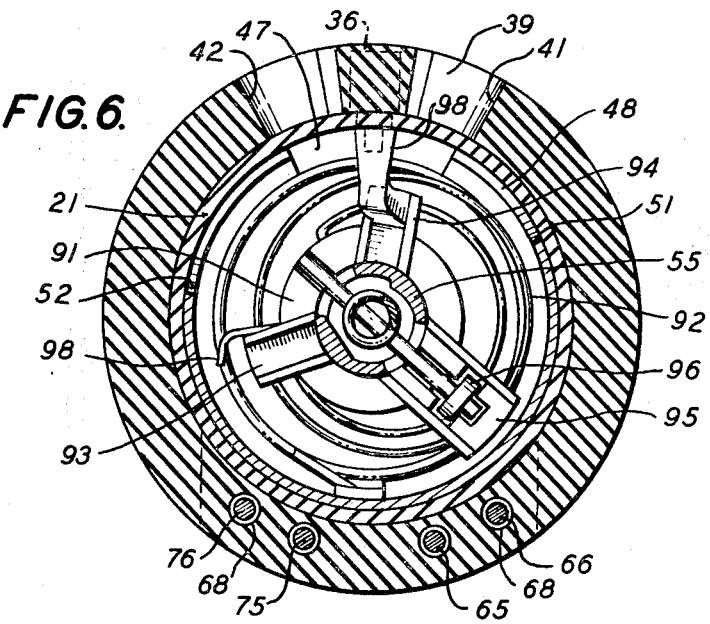
INVENTOR.
DONALD W. BELLROSE
BY
W. J. Gribble
ATTORNEY

United States Patent Office 3,522,394
Patented July 28, 1970

3,522,394
COMBINED AUTOMOBILE IGNITION AND
LIGHT SWITCH
Donald W. Bellrose, 810 N. Dos Robles Place,
Alhambra, Calif. 91801
Filed Jan. 24, 1969, Ser. No. 793,857
Int. Cl. H01h 9/28, 27/00
U.S. Cl. 200—44         4 Claims

ABSTRACT OF THE DISCLOSURE

A conventional key-operated automobile ignition switch has a partly open case. A switch arm accessible through the opening and which changes position with change in condition of the switch is combined with a surrounding housing containing a rotatable contactor spindle. The spindle is spring biased axially and has a guide pin lodged in a guide path in the housing. A guide pin extension is contacted by the switch arm. The housing carries headlight contacts which are connected to complete a circuit when the spindle rotates. Axial pressure on the spindle moves the guide pin into the path of the rotating switch arm. The housing guide path is such that the connector on the spindle is moved out of contact with the lighting circuit when the ignition switch is turned off.

Conventional automobile ignition swicthes are wired so that the electrical accessories are turned off when the ignition is turned off, but the exterior lights are independently controlled such that the condition of the ignition switch does not affect the condition of the headlights and taillights. The purpose of linking the accessories to the ignition switch is to prevent battery drain if accessories, such as the radio, are left on. An even faster battery drain condition exists if the headlights are inadvertently left on.

BRIEF DESCRIPTION OF THE INVENTION

I have invented apparatus by which the ignition switch automatically breaks lighting circuit continuity when the ignition is turned off. The invention contemplates apparatus combined with the conventional cylindrical, key-operated ignition switch normally mounted in the control panel of the dashboard. A cylindrical housing surrounds the ignition switch and may be secured to the control panel. The ignition switch is rigidly supported in the housing. An ignition switch arm which is responsive to "on" and "accessory" conditions of the ignition switch is exteriorly accessible. Electrical contacts on the housing connect to the lighting equipment. A contactor spindle is rotatably supported in the housing. The spindle carries electrical continuity means adapted to connect the lighting equipment contacts. A spring biases the spindle axially away from connecting condition with the contacts. A guide pin on the spindle resides in a guide path in the housing. An extension of the guide pin extends into the ignition switch. The guide path in the housing is such that when the spindle is moved against the spring bias, the spindle rotates to move the guide pin into the rotating path of the ignition switch arm. When both the lights and the ignition switch are "on" the guide pin extension and the ignition switch are adjacent. When the ignition switch is turned toward the "off" position the switch arm urges the guide pin along the guide path in the housing to a point in the guide path where the spring bias controls the spindle and removes the spindle continuity means from contact with the lighting equipment contact.

Similar contacts may be used in conjunction with the "accessory" position of the switch, wherein movement of the ignition switch from accessory position to on position urges the guide pin and the contactor spindle into biased position wherein the spindle continuity means is out of contact with the electrical equipment circuit, such as the parking lights.

The invention is economical to construct and simple in operation. Conventional ignition switches are easily adapted to combine with the other elements of the invention. There is no interference with the starter motor function of the ignition switch. No special wiring net need be established for the headlights and taillights. These and other advantages of the invention are apparent from the following detailed description and drawing.

BRIEF DESCRIPTION OF THE DRAWING

FIG. 5 is a side elevational view, partly in section, of the preferred embodiment of the invention; and FIG. 6 is a sectional elevation taken along line 6—6 of FIG. 5.

In the figures like parts are given like reference numbers.

Figure 1:
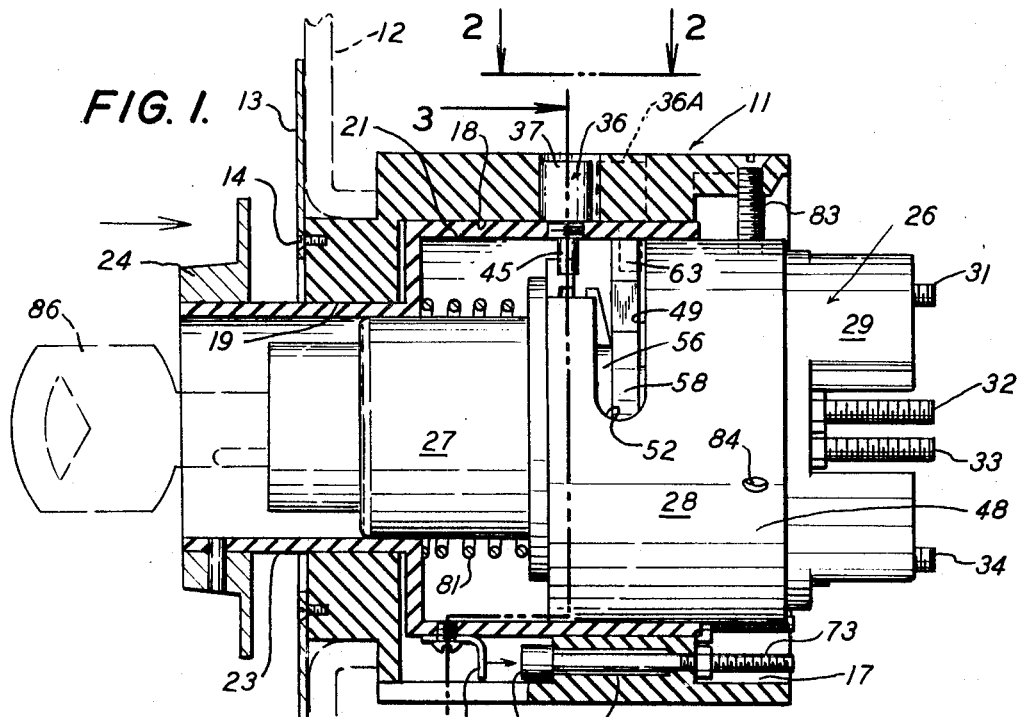
FIG. 1 is a longitudinal sectional elevation of a device in accordance with the invention.
Figure 2:
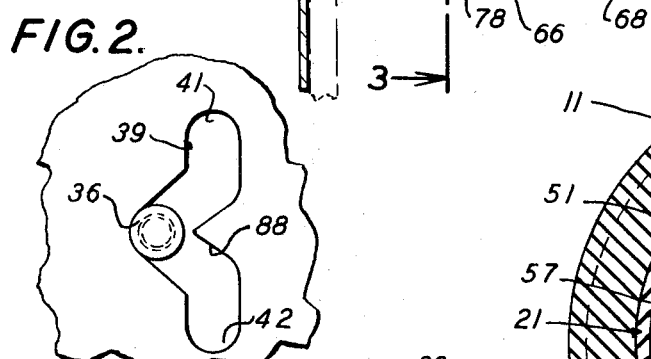
FIG. 2 is a fragmentary plan view taken along line 2—2 of FIG. 1.

In the embodiment of FIGS. 1–4 a stepped cylindrical housing 11 is restrained within a conventional control panel 12 by an annular plate 13 secured to the housing by conventional screws 14. The interior of the housing has three annular cavities of which the largest cavity 17 is remote from the control panel. Intermediate cavity 18 and small cavity 19 retain a contactor spindle 21 rotatably within the housing. A control neck 23 of the spindle extends exteriorly of the housing. A control knob 24 is pinned to the neck. Normally the knob is spaced from the control panel so that the spindle has limited axial freedom.

A conventional automotive ignition switch 26 resides in part within the contact spindle. The switch comprises a tumbler section 27, a switch rotor section 28 and a connector holder 29. Electrical connector elements 31, 32, 33, 34 extend outwardly from the switch housing. These connector elements receive the conventional battery and ignition leads (not shown).

The contactor spindle threadably engages a radial guide pin 36. The guide pin has a cylindrical head 37 which resides within a housing guide path 39. As can be seen from FIG. 2, the guide path has two spaced recesses 41, 42 into which the guide pin may be moved.

A thrust pin 45 extends inwardly from the guide pin. When both the lighting equipment and the ignition are "off" the thrust pin resides within an opening 47 cut within the cylindrical shell 48 of the switch, best seen in FIG. 6. A second shell opening 49, which is larger in peripheral extent than opening 47, extends arcuately along the shell periphery from a radial cut-out wall 51 to a second radial cut-out wall 52.

As is conventional, an ignition switch shaft 55 carries a switch detent rotor 56 and a switch contact rotor 57. In addition, a switch arm disk 58 is fixed to the switch shaft by convenient means such as a pin 61 between the switch contact rotor and the switch detent rotor. A switch arm 63 extends from the disk.

Contact screws 65, 66 extend through cavities 68 in the housing wall from a peripheral housing chamber defined by walls 69, 71 into the housing cavity 17. The contacts terminate in threaded ends 73 which provide connection to the wires of the headlight circuit. Similar contact screws 75, 76 extend through the housing for connection to the parking lights of the automobile. While the lcoation of the contacts has been shown as diametrically opposed to the guide pin, the location of the peripheral chamber and the contact screws may be at any convenient point within the housing.

Contact spindle 21 carries a continuity contactor 78 movable within the housing chamber. The contact is wide enough to connect between either of the contact screw pairs 65, 66 or 75, 76. Contact spindle 21 is biased along the longitudinal axle of the switch by a compession spring 81.

The ignition switch may be fixed within the housing by means of flathead screws, such as the screw 83, threadably engaged with the housing and fitting into sockets 84 spaced about the periphery of the ignition switch shell.

Figure 3:
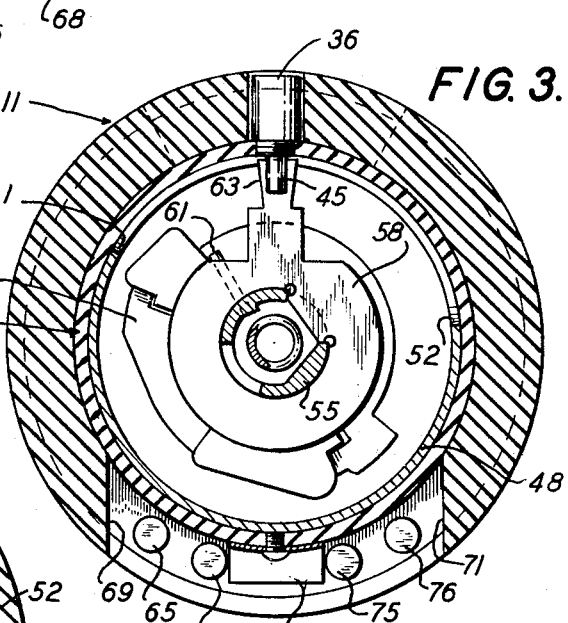
FIG. 3 is a sectional elevation taken along the line 3—3 of FIG. 1.

FIG. 3 shows the condition of the control spindle and the ignition switch arm when both the lights and the ignition are in "off" position. As can be seen from FIG. 1, the guide pin is axially spaced from the switch arm.

Figure 4:
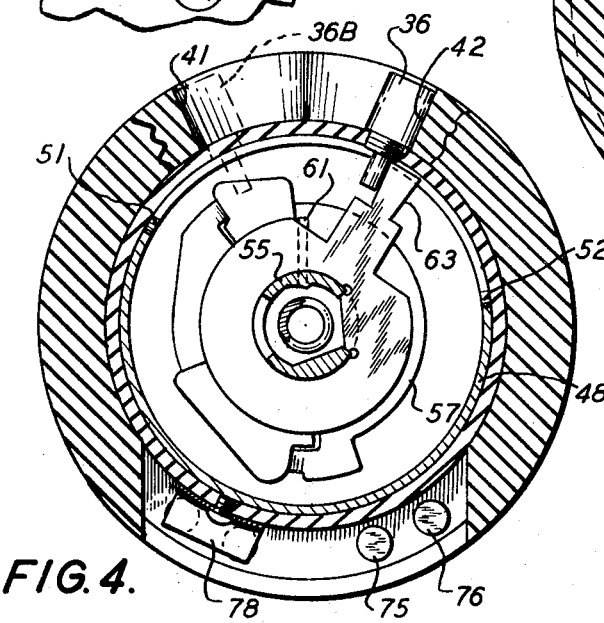
FIG. 4 is a sectional elevation similar to FIG. 3 showing a different condition of the ignition switch and headlight switch.

In FIG. 4, rotation of a key 86 has turned the switch shaft 55 and the attached switch arm and ignition switch rotor into the "on" position. The contactor spindle is pressed inwardly against bias spring 81 and rotated into "on" position for the headlights. Such motion of the spindle moves guide pin 36 into recess 42 of the guide path. The spring pressure retains the guide pin in recess 42 in the position as shown in FIG. 1 by dotted lines 36A. Thus thrust pin 45 is in the path of rotation of switch arm 63. When the ignition switch is turned to "off" position switch arm 63 assumes the condition shown in FIG. 3. In order to reach this position the switch arm displaces guide pin 36 from recess 42. Under the urging of the switch arm and spring 81 the guide pin traverses ramp 88 of the guide path and is displaced out of the rotation path of the switch arm into "off" position for the headlights as well as the ignition.

As can be seen from FIG. 4, continuity contact 78 is moved into position against contacts 65, 66 which are connected to the headlight circuit. From FIG. 1 it can be seen that such contact can be accomplished only if axial as well as radial displacement of contact 78 takes place. Therefore, it is necessary that control knob 24 of the contact spindle be depressed toward the control panel as well as turned in order for the continuity contact to move smoothly into place. Conversely, under the urging of ignition switch arm the guide pin moves the contactor spindle axially as well as radially away from the contacts.

It is obvious that reverse rotation of the key of the ignition switch moves ignition arm 63 into alignment with the dotted position 36B of the guide pin in FIG. 4. Thus when the control knob of the contact spindle is turned to "parking" position, continuity contact 78 is displaced against parking light contact screws 75, 76, establishing an electrical circuit. When the ignition switch is turned from "accessory" to "off" the contact between the ignition arm and the thrust pin of the guide pin displaces the control spindle in the reverse of the manner described with respect to the position of FIG. 4.

While FIG. 4 shows the displacement of the ignition switch arm when in "on" position, further clockwise rotation of the arm takes place when the ignition switch is turned through "on" position to the starter position. Thus the shell opening 49 is extended to radial cut-out wall 52 in order to accommodate further clockwise rotation of the switch arm under starting conditions.

The housing guidepath controls the motion of the thrust pin on the contactor spindle so that the headlights or parking lights may be operated without the ignition switch being "on." However, with the switch "on," the lights are disconnected when the ignition switch is returned to "off."

The modifications to the conventional ignition switch, such as the FoMoCo ignition switch pictured, in order to combine the conventional ignition switch with the apparatus of the invention are slight. Both connector element holder 29 and switch contact rotor 57 may be removed conventionally from the back of the ignition switch shell to accommodate addition of switch arm disk 58. Existing ignition switches can therefore be easily modified to combine with other elements of the invention. Switch shell openings 49 and 47 are easily accomplished with no interference with the normal operation of the ignition switch.

The presently preferred embodiment of the invention is illustrated in FIGS. 5 and 6. Like the previously described embodiment of FIGS. 1–4 the preferred embodiment comprises a housing 11 adapted to fit within a control panel (not shown). The housing receives a contact spindle 21 with a control knob 24 and a conventional ignition switch 26. The ignition switch has tumbler section 27, detent rotor and switch contactor rotor section 28 and connector element holder 29. The switch is fixed within the housing by a plurality of screws, such as screw 83. A spring 81 biases the contactor spindle away from switch section 28. A spindle guide pin 36 resides in a guide path 39 within the housing. The guide path has the general configuration of the guide path shown in FIG. 2. The guide pin is threadably engaged with the peripheral wall of spindle 21 and has a thrust pin 45 extending inwardly of the spindle. Within the switch shell 48 switch shaft 55 of the conventional ignition switch supports a detent rotor 91. The rotor is springloaded by a spiral spring 92 and has radial arms 93, 94, 95. Arm 95 supports a detent roller 96 and arm 93 engages an end 98 of the spiral spring. The shell is cut away to define an opening 47 to receive the thrust pin when in off position and is further cut away between cut-out end walls 51 and 52 to clear a switch arm 98.

Unlike the embodiment of FIGS. 1–4, the ignition switch arm is an integral part of the detent rotor of the ignition switch. The ignition switch arm is cast or otherwise formed integrally with detent rotor arm 94 such that it occupies the same relative position that previously described switch arm 63 does with respect to the longitudinal axis of the switch and with respect to guide pin 36. In function the embodiment of FIGS. 5 and 6 is similar to the previously described embodiment.

The switch arm may extend in varying orientations with respect to the switch detent rotor, depending upon the placement of the guide pin in the connector spindle and the guide path in the housing. In any event, the relationship between the thrust pin and the ignition switch arm is such that displacement of the switch arm to "off" position when the connector spindle is in "on" position urges the guide pin along the guide path such that the bias spring 81 removes the spindle continuity contact from contact with either the headlight contact screws or the parking light contact screws.

The illustrative embodiments of the invention heretofore described demonstrate the simplicity of operation and economic feasibility of the inventive concept. In either embodiment, a relatively simple mechanical action results in positive defeat of headlight circuit continuity when the ignition switch is turned to "off" position.

I claim:

1. A combined automobile ignition and light control switch comprising a housing adapted to be secured to the control panel of an automobile, and ignition switch having a detent rotor on a switch shaft supported in the housing, an ignition switch arm responsive to function conditions of the ignition switch, electrical contacts on the housing connected to the exterior lights of the automobile, a contactor spindle rotatably supported in the housing, electrical continuity means on the spindle adapted to connect the contacts, a spring biasing the spindle away from connecting condition with the contacts, a guide pin on the spindle, and a guide path in the housing, said guide path locating the contactor spindle in either "off" or "on" positions, the ignition switch arm extending from the ignition switch being inhibited by the guide pin when in "on" condition from motion toward an "off" position, and such arm and pin contact being such that further motion of the switch arm in response to ignition switch rotation results in ousting of the pin along the guide path to move the contactor spindle into the control of the biasing spring.

2. A control switch in accordance with claim 1 wherein the ignition switch arm responds in arcuate motion to a change in function conditions of the ignition switch.

3. A control switch in accordance with claim 1 wherein the ignition switch arm extends from a disc fixed to the switch shaft.

4. A control switch in accordance with claim 1 wherein the ignition switch arm comprises a radial extension of the switch detent rotor.

References Cited

UNITED STATES PATENTS 2,046,831   7/1936   Lowe _____ 200—44
2,519,758   8/1950   Heidman _____ 200—44

ROBERT K. SCHAEFER, Primary Examiner

H. J. HOHAUSER, Assistant Examiner

U.S. Cl. X.R.

340—64